Jan. 16, 1962 F. P. PRIESTLY 3,017,487
HOT-WIRE CUTTER
Filed Feb. 11, 1960 2 Sheets-Sheet 1
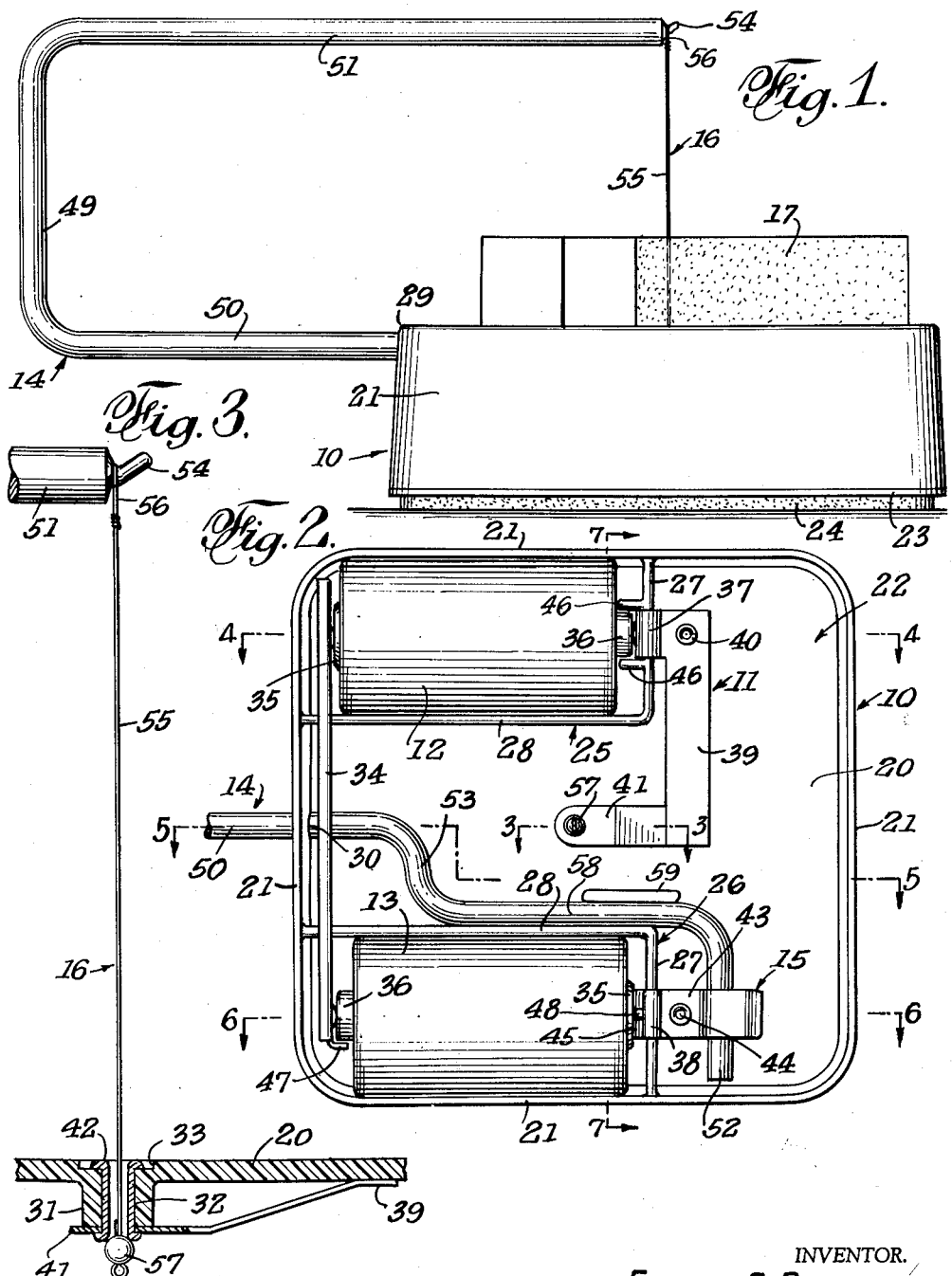
INVENTOR.
FRANK P. PRIESTLY
BY C. F. Stratton
ATTORNEY Jan. 16, 1962 F. P. PRIESTLY 3,017,487
HOT-WIRE CUTTER
Filed Feb. 11, 1960 2 Sheets-Sheet 2
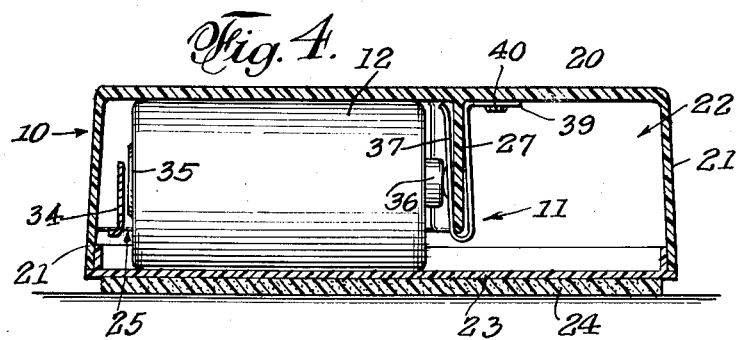
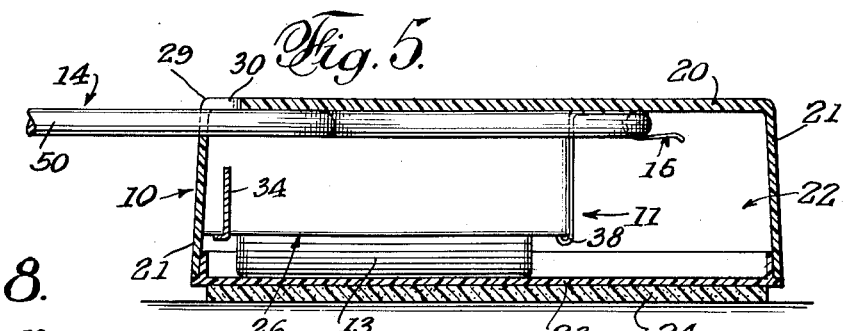
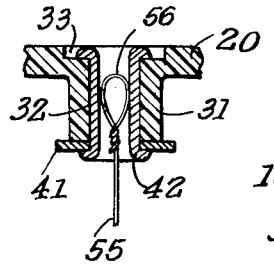
INVENTOR.
FRANK P. PRIESTLY
BY C. G. Stratton
ATTORNEY

United States Patent Office 3,017,487
Patented Jan. 16, 1962

3,017,487
HOT-WIRE CUTTER
Frank P. Priestly, 17159 Stare St., Northridge, Calif.
Filed Feb. 11, 1960, Ser. No. 8,193
11 Claims. (Cl. 219—29)

This invention relates to a cutting device, particularly to a cutter utilizing a heated wire to cut through materials such as expanded polystyrene. This invention is an improvement over the cutting device disclosed in my Patent No. 2,916,595, dated December 8, 1959.

An object of the present invention is to provide a hot-wire cutter that embodies a novel holding means for the battery cells that provide the source of electric current for heating the wire.

Another object of the invention is to provide a hot-wire cutter that embodies means facilitating removal and replacement of the wire.

A further object of the invention is to provide a hot-wire cutter that incorporates a novel and easily produced and assembled wire-tensioning gooseneck.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a side elevational view of a hot-wire cutter according to the present invention.

FIG. 2 is a plan view looking up into the housing base of said cutter with the bottom closure thereof removed.

FIG. 3 is an enlarged and fragmentary vertical sectional view as taken on line 3—3 of FIG. 2.

FIGS. 4, 5, 6 and 7 are vertical sectional views as taken on the respective lines 4—4, 5—5, 6—6 and 7—7 of FIG. 2.

FIG. 8 is an enlarged detailed sectional view illustrating the manner of removal and insertion or replacement of a heating wire.

The hot-wire cutter that is illustrated comprises, generally, a housing base 10, means 11 for electrically removably mounting a pair of battery cells 12 and 13, a gooseneck 14 carried by the base, means 15 connecting the gooseneck electrically to the cells 12 and 13, and hot-wire means 16 extending between the gooseneck and the means 11 and placed in electric circuit with the cells 12 and 13 upon deflection by a piece of work 17 movable over the surface of the base.

The housing base 10 is preferably rectangular, as shown, and is formed to have a flat top 20 over the surface of which the piece of work 17 is adapted to be moved, and side walls 21 to define an interior space 22. The base 10 includes a bottom closure plate 23 that is shown as provided with a shock-absorbing support cushion 24 and is removable to afford access to the space 22. At opposite sides of said interior space 22 are provided generally rectangular cell enclosures 25 and 26 that are open at the bottom so that the respective cells 12 and 13 may be slipped thereinto and removed, as desired. Said enclosures on two sides are defined by two of the base walls 21 at opposite corners, by end walls 27 and side walls 28. Between the cell enclosures and at the corner 29 that is formed between top 20 and the side wall 21 that is opposite and parallel to walls 27, there is provided an opening 30 that is formed partly in the top 20 and partly in said latter side wall 21, as shown in FIG. 5. Said opening, therefore, is of a size to accommodate entry of the portion of the gooseneck that resides within the interior 22 of the base. Preferably at the center thereof, the top 20 is provided with an inreaching boss 31 that has a vertical opening 32 therethrough, with a recess 33 on the outer side of said top.

As can be seen from the drawings, the housing base, together with its closure, is made of a plastic material. In any case, the same is of dielectric material, although the closure 23 may be made of metal, if desired.

The means 11 comprises a metallic bar 34 that spans across the interior of the base and is affixed thereto by a slotted connection with the walls 28 of the cell enclosures 25 and 26. Cement may be used, if desired, to so affix said bar that its ends are in position to be engaged by the outer electrode 35 of one cell and the central electrode 36 of the other, so that on the side where said bar is, the cells are connected electrically in series.

Said means 11 also comprises a spring contact 37 that is folded over the bottom edge of the end wall 27 of the cell enclosure 25 and engaged by the inner or central electrode 36 of the cell 12, and a spring contact 38 that is folded over the bottom edge of the end wall 27 of the cell enclosure 26 and engaged by the outer electrode 35 of the cell 13. Said contact 37 is provided with an extension 39 that is fastened, as by an eyelet 40, to the under face of top 20, said extension terminating in an apertured offset portion 41 that extends into superimposed register with the hole or opening 32 in the boss 31. An eyelet 42 extends through said opening and through the apertured portion 41 and affixes the latter in place, the eyelet 42, of course, being in electrical connection with the cell 12 through the extension 39 and the contact 37. The contact 38 has an extension 43 that is fastened by an eyelet 44 to the under face of top 20. As seen in Fig. 7, said contact has a bifurcated contact portion 45 that is directed to be engaged by the electrode 35 of the cell 13.

In the above manner, the terminal 38 is electrically connected by the bar 34, contact 37, extension 39 and end 41, through the cells 12 and 13, to the eyelet 42.

The series arrangement of the cells 12 and 13 can be assured by providing the enclosures with means that will not permit the cells to be placed in inoperative positions in their closures. The inward extension ribs 46 of the wall 27 of enclosure 25 flank the central electrode 36 of the cell 12 and allow the same to engage the contact 37. However, if the cell were reversed, end-for-end, the same could not be slipped into enclosure 25 since the over-all length of the cell is greater than the distance from the bar 34 to the ribs 46. The lug 47 on the end of bar 34 prevents end-for-end reversal of cell 13 since the distance between said lug and an inreaching rib 48 in the bifurcation of the contact portion 45 is less than the over-all length of the cell 13, yet said cell slips easily into operative position between the bar and contact portion 45 when the central electrode 36 of the cell engages the bar with the lug 47 outside thereof, as shown.

The gooseneck 14 has a generally U-shaped form with a vertical leg 49 connecting generally horizontal arms 50 and 51. Said arm 50 is passed through the mentioned hole 30 in the base and the portion within the base is provided with at least the end bend offset 52 and may have an additional bend or offset 53. Said offsets are formed to be in the same plane so that said arm 50 has a flatwise and gooseneck-stabilizing engagement with the under surface of the base top 20. It will be clear that arm 51 has resilience relative to arm 50 and that the leg 49, being spaced from the base, provides clearance for movement of the piece of work 17 beyond the perimeter of the base. A reduced extension 54 is provided on the end of arm 51, the same being located above and in substantial register with the eyelet 42.

The means 15 is shown as a spring extension of the contact extension 43 and which constitutes a clip for engaging the arm bend 52 and thereby retaining the gooseneck in non-shifting position on the base. It will be clear that said means 15 connects the gooseneck in the circuit of cells 12 and 13.

The hot-wire means 16 comprises a heating wire 55 of Nichrome or other high electrical resistance material. One end of said wire is formed to have a loop or eye 56 of a size to connect over the arm end 54 and yet small enough to pass through the eyelet 42, as shown in FIG. 8. The other end of said wire is provided with a dielectric member 57 in the shape of a sphere and of a size to fit against the eyelet 42 but not enter the bore or passage in said eyelet. It will be clear that the wire 55 passes through said eyelet but does not ordinarily touch the same because of the centering form of the insulator 57. Since the wire is kept taut by the resilience of the gooseneck, the wire and eyelet 42 constitute the elements of a normally-open switch in the electric circuit through the battery cells.

Upon deflection of the wire 55, as by a work piece 17, the circuit is closed when the same touches the eyelet, due to such deflection, and in a few seconds the wire heats up so the same may cut through the work piece 17 as the latter is moved over the base 10. The instant that pressure of the work piece on the wire is released or eased, the circuit opens automatically, as can be seen, and the wire cools off.

The gooseneck is stabilized not only by the means 15 but also is held against lateral displacement with the hole 30 as a fulcrum by the portion 58 thereof engaged between the wall 28 of enclosure 26 and a rib or embossment 59 depending from the top 20 of the base.

While I have illustrated and described what I now contemplate to be the best mode of carrying out my invention, the construction is, of course, subject to modification without departing from the spirit and scope of my invention. Therefore, I do not wish to restrict myself to the particular form of construction illustrated and described, but desire to avail myself of all modifications that may fall within the scope of the appended claims.

Having thus described my invention, What I claim and desire to secure by Letters Patent is:

1. A hot-wire cutter comprising a dielectric housing base provided with two spaced battery cell enclosures, a common conductor bar extending into each enclosure and adapted to contact the ends on the side of the cells in said enclosures, a resiliently held heating wire extending from within the housing upwardly thereabove, a contact in one enclosure adapted to engage the opposite end of the cell in the latter enclosure and connected to one end of the wire, a contact in the other enclosure adapted to engage the opposite end of the cell in said other enclosure, and a tubular terminal on the latter contact and through which said wire extends and adjacent the other end of the wire, said latter wire end and the tubular terminal constituting a normally-open switch that is closed upon deflection of the wire by a piece of work pressed thereagainst.

2. A hot-wire cutter according to claim 1 in which a gooseneck is provided to hold the wire taut, said gooseneck having an arm extending partly into the housing base with offset bends therein to stabilize the gooseneck.

3. A hot-wire cutter according to claim 1 in which each enclosure for the battery cells is provided with means in interfering engagement with cells that are attempted to be placed in the enclosure in end-turned position.

4. In a hot-wire cutter, a dielectric base having an opening therethrough, a metal eyelet disposed in such opening, means to conduct electric current to the eyelet, a heating wire extending through the eyelet and provided at one end with an insulator element that engages one end of the eyelet and centers the wire in spaced relation to the eyelet, and means to hold the other end of wire taut, means to conduct electric current to said other end, said eyelet and the spaced portion of the wire that is coincidental therewith constituting a normally-open switch that is closed upon lateral displacement of the wire into contact with the eyelet.

5. In a hot-wire cutter, a dielectric housing base, a metal gooseneck having an arm residing partly within the base and extending laterally therefrom, said gooseneck having an upper resilient arm to hold an end of a heating wire extending upwardly from the base, said first gooseneck arm having stabilizing means for maintaining said arms oriented in a plane with respect to said base comprising at least two offset bends therein in a common plane and in flatwise engagement against the inner face of the base top, and conductive means to engage one of said offset bends to stabilize the gooseneck relative to the base.

6. In a hot-wire cutter according to claim 5, said first-mentioned arm comprising said stabilizing means having a portion parallel to and offset from the plane of the gooseneck, and means in the base to engage said portion and hold the same against lateral displacement.

7. In a hot-wire cutter, a base having battery cell enclosures, a contact having a portion disposed at one end of one enclosure adapted for engagement with a negative terminal of one cell and a second portion disposed in an adjacent end of another enclosure adapted for engagement with the positive terminal of another cell, and contact means disposed in the opposite adjacent ends of said enclosures adapted to connect the cells disposed therein in electric circuit, and means in each enclosure including a lug located adjacent one portion of said contact and a projection located adjacent said contact means in interference with the cells preventing their placement in the enclosures in end-turned relationship.

8. In a hot-wire cutter, a base having battery cell enclosures, contacts at both ends of each enclosure adapted to connect the terminals of the cells disposed therein in electric circuit, and means in each enclosure in interference with the cells preventing their placement in the enclosures in end-turned relationship, a common conductor bar extending partly into each enclosure, and a projection on one end of said bar out of engagement with said terminals as part of the interference means for one of the cells.

9. In a hot-wire cutter, a dielectric base having a flat work-piece-supporting top with a hole therethrough, a metal eyelet in said hole, and a tautly held wire extending through the eyelet in spaced relation to the eyelet walls, a source of electric current having one side connected to the eyelet and the other side to the wire, said wire and eyelet constituting a normally-open switch that closes said circuit upon lateral deflection of the wire into contact with the eyelet walls.

10. In a hot-wire cutter according to claim 9, said wire having a loop in the end thereof remote from the eyelet, said loop being small enough to pass through the eyelet during removal and replacement of the wire.

11. A hot-wire cutter comprising a housing base provided with a plurality of battery cell supporting means, a common contact adapted to interconnect terminals of the cells, a resiliently held heating wire extending from within the housing upwardly thereabove, a contact adapted to engage a terminal at the opposite end of another of the cells, and a tubular terminal on the latter contact and through which said wire extends, said latter wire end and the tubular terminal constituting a normally-open switch that is closed upon deflection of the wire by a piece of work pressed thereagainst.

(References on following page)

References Cited in the file of this patent

UNITED STATES PATENTS

| | | |
|---|---|---|
| 1,146,806 | Manson | July 20, 1915 |
| 1,913,696 | Wiley et al. | June 13, 1933 |
| 2,224,742 | Muldoon | Dec. 10, 1940 |
| 2,646,494 | Fegan | July 21, 1953 |
| 2,727,128 | Jaye | Dec. 13, 1955 |
| 2,916,595 | Priestly | Dec. 8, 1959 |

FOREIGN PATENTS

| | | |
|---|---|---|
| 62,159 | France | Dec. 29, 1954 |

(Addition to Patent 960,826)